(12) United States Patent
Halili et al.

(10) Patent No.: US 12,243,164 B2
(45) Date of Patent: Mar. 4, 2025

(54) METHOD FOR GENERATING A HIERARCHICAL DATA STRUCTURE, HIERARCHICAL DATA STRUCTURE, AND METHOD FOR STREAMING THREE-DIMENSIONAL OBJECTS

(71) Applicant: Ocean Maps GmbH, Salzburg (AT)

(72) Inventors: Kreshnik Halili, Maishofen (AT); Thomas Nemetz, Salzburg (AT)

(73) Assignee: Ocean Maps GmbH, Salzburg (AT)

( * ) Notice: Subject to any disclaimer, the term of this patent is extended or adjusted under 35 U.S.C. 154(b) by 316 days.

(21) Appl. No.: 17/879,843

(22) Filed: Aug. 3, 2022

(65) Prior Publication Data

US 2023/0042578 A1    Feb. 9, 2023

(30) Foreign Application Priority Data

Aug. 4, 2021    (AT) ............................... A 50638/2021

(51) Int. Cl.
*G06T 17/00*    (2006.01)
*G06T 7/12*    (2017.01)
*G06T 15/04*    (2011.01)
*G06T 17/20*    (2006.01)

(52) U.S. Cl.
CPC .............. *G06T 17/005* (2013.01); *G06T 7/12* (2017.01); *G06T 15/04* (2013.01); *G06T 17/20* (2013.01)

(58) Field of Classification Search
CPC ......... G06T 17/005; G06T 7/12; G06T 15/04; G06T 17/20
See application file for complete search history.

(56) References Cited

U.S. PATENT DOCUMENTS

| 6,208,997 | B1 * | 3/2001 | Sigeti ................. G01C 21/3826 382/124 |
| 6,738,424 | B1 * | 5/2004 | Allmen .................. H04N 19/23 375/E7.084 |
| 8,847,949 | B1 * | 9/2014 | Strauss ................. G06T 17/005 345/419 |
| 9,865,085 | B1 * | 1/2018 | Eng ....................... G06T 17/005 |

(Continued)

FOREIGN PATENT DOCUMENTS

| CN | 110717967 A | 1/2020 |
| EP | 2747032 A1 | 6/2014 |
| EP | 3346449 A1 | 11/2018 |

OTHER PUBLICATIONS

Austrian Search Report completed on Jun. 15, 2022, from Austrian Patent No. A 50638/2021, filed on Aug. 4, 2021. 1 page.

(Continued)

*Primary Examiner* — Michelle L Sams
(74) *Attorney, Agent, or Firm* — HoustonHogle LLP

(57) ABSTRACT

The present invention relates to a method for generating a hierarchical data structure of a three-dimensional object, such a hierarchical data structure, and a method for streaming three-dimensional objects. In the method according to the invention, a hierarchical data structure is generated from a three-dimensional object, which has and possibly consists of three-dimensional object data and a texture that is mapped onto the object data, by first converting the three-dimensional object data into multiple detail levels and then segmenting the detail levels, wherein the texture is respectively mapped onto the segments with a corresponding resolution.

15 Claims, 11 Drawing Sheets

(56) References Cited

U.S. PATENT DOCUMENTS

| | | |
|---|---|---|
| 10,950,041 B2 | 3/2021 | Nemetz et al. |
| 2020/0302689 A1* | 9/2020 | Li .......................... G06T 17/20 |

OTHER PUBLICATIONS

Park, Jiro et al., "A hierarchical framework for large 3D-mesh streaming on mobile systems," Multimedia Tools Appl, DOI 10.1007/s11042-014-2383-6, Published on Nov. 29, 2014, 22 pages.

Gao, S., et al., "A realtime rendering framework of large dataset environment based on precomputed HLOD," In: Second Workshop on Digital Media and its Application in Museum & Heritages, DOI 10.1109/DMAMH.2007.47; IEEE, 212-217 (2007).

Teixeira, D., "Baking Normal Maps on the GPU"; in GPU Gems3, No. v. 3 in Lab Companion Service, edited by H. Nguyen and NVIDIA Corporation, Chapter 22, Addison-Wesley (2008).

* cited by examiner

METHOD FOR GENERATING A HIERARCHICAL DATA STRUCTURE, HIERARCHICAL DATA STRUCTURE, AND METHOD FOR STREAMING THREE-DIMENSIONAL OBJECTS

RELATED APPLICATIONS

This application claims priority to Austrian Patent Application No. A50638/2021, filed on Aug. 4, 2021, which is incorporated herein by reference in its entirety.

BACKGROUND OF THE INVENTION

A method with which three-dimensional objects, which are displayed using a 3D mesh, can be transmitted to a mobile end device and displayed thereon can be inferred from "A hierarchical framework for large 3D-mesh streaming on mobile systems" by J. P. Park & H. Lee, Multimedia Tools APPL (2016), pages 1983-2004, Springer-Verlag. For this purpose, the 3D mesh is divided into segments, which each have approximately the same number of mesh points. The 3D mesh that is segmented in this way can be transmitted segment by segment to a mobile end device. To accomplish this, the segment mesh can also be simplified, i.e. reduced in resolution. Such a reduced segment mesh can be displayed using a smaller quantity of data and can thus be more easily transmitted via a data network and displayed on a mobile end device.

A method for dynamic image synthesis (rendering) using LOD (level of detail) technology can be inferred from CN 110717967 A. With this method, a 3D mesh is used, which is structured as a KD tree.

EP 2747032 A1 concerns a method for the photorealistic visualisation of a hierarchically processed three-dimensional terrain data set in real time on a mobile terminal as well as a computer program for carrying out this method. In this context, a method for generating a hierarchical data structure is also used, in which small segments are combined to form larger segments.

US 2020302689 A1 discloses systems and methods, various embodiments of which enable the conversion of massive mesh datasets (i.e., 3D grids of triangular cells with textures) into a hierarchical format. Embodiments may increase processing efficiency and scalability when creating and/or displaying massive mesh datasets in hierarchical format.

U.S. Pat. No. 9,865,085 B1 discloses systems and methods for three-dimensional modelling using heuristics. A method comprises reading a plurality of three-dimensional models of a target, each of the models having a unique level of resolution (LOD), assembling an aggregated three-dimensional model using a hierarchical tree representation (HLOD) of the plurality of three-dimensional models by skipping levels of detail in the hierarchical tree, and rendering the levels of the hierarchical tree that were not skipped. Merging of overlapping sections of the aggregated model can be achieved by bivariate visibility tests.

EP 3346449 A1 relates to a computer-implemented preprocessing method for dividing a point cloud into cells, wherein a set of detail levels is generated for each cell, each detail level comprising a set of points and a minimum distance; a data structure for storing a preprocessed point cloud; a rendering method for generating a pixelated image based on a stored preprocessed point cloud; and a viewing method involving a computer system for selecting a view on a user interface and presenting a pixelated image of a point cloud on a screen.

In GAO S. et al. "A realtime rendering framework of large dataset environment based on precomputed HLOD"; In: Second Workshop on Digital Media and its Application in Museum & Heritages (DMAMH 2007); IEEE, December 2007. pp. 212-217; a realtime rendering framework for large datasets based on precomputed HLOD is presented. By using different granularity and hierarchy to partition the model and the environment, the details can be improved and the rendering time can be reduced. A format for HLOD files is proposed. The result of preprocessing is saved to increase the reusability of the system.

SUMMARY OF THE INVENTION

The present invention relates to a method for generating a hierarchical data structure of a three-dimensional object, such a hierarchical data structure, and a method for streaming three-dimensional objects.

For the purposes of the present document, "three-dimensional objects" have and possibly consist of three-dimensional object data and a texture that is mapped onto the object data. The three-dimensional object data are as a rule composed of a 3D mesh.

There is a need to be able to display three-dimensional objects on mobile end devices, wherein they should not merely be displayed as a 2D projection, but should retain their 3D properties.

The object of the invention is to create a method for generating a hierarchical data structure of a three-dimensional object, such a hierarchical data structure, and a method for streaming three-dimensional objects, which enable the high quality display of three-dimensional objects on mobile end devices.

The object is attained by the subjects of the independent claims. Advantageous embodiments of the invention are disclosed in the respective dependent claims thereof.

In the method according to the invention for generating a hierarchical data structure of a three-dimensional object, having three-dimensional object data and a texture that is mapped onto the object data, with a predetermined number n+1 of detail levels (LOD: levels of detail), wherein the hierarchical data structure is a tree structure with a root node and multiple subordinate nodes, the hierarchical data structure is embodied with the following steps:

Generation of multiple levels of the three-dimensional object data at different resolutions corresponding to the predetermined detail levels, wherein the three-dimensional object data of the detail level with the lowest resolution are referred to as 3D detail level 0 and the three-dimensional object data of the detail level with the highest resolution—which corresponds to the original data—are referred to as 3D detail level n, and the individual 3D detail levels are generated by reducing the resolution from the original data of the three-dimensional object data, i.e. the 3D detail level n, Assignment of the 3D detail level 0 with the lowest resolution to the root node and assignment of the remaining 3D detail levels to a list of 3D detail levels, wherein the 3D detail levels constitute elements that are to be segmented, a) Segmentation of the elements that are to be segmented, wherein all of the elements of the respective list having the same segment edges are respectively cut into i approximately equivalent segments and the equivalent segments of the different data levels are respectively compiled into i lists, b) Assignment of the i segments of the detail level with the lowest resolution to a respective node, wherein the nodes are each subordinate to a node to which a segment of a detail level with the next lower resolution has been previously assigned and wherein the segments assigned to a node are removed from the respective list, and Repetition of steps a) and b) until at least parts of the detail level with the highest resolution have been segmented n times, wherein the segments of the different 3D detail levels contained in the lists constitute the elements that are to be segmented, Assignment of level textures to the segments in the different 3D detail levels, which are respectively converted into a resolution that is proportional to the resolution of the respective 3D detail level.

In this method, therefore, first the original data of the three-dimensional object data, i.e. the 3D detail level n, are used to generate three-dimensional object data with a reduced resolution for the respective detail levels that are to be generated. Intrinsically known reduction methods can be used for this. The three-dimensional object data with a different resolution that are generated in this way are then segmented by means of steps a) and b), wherein the greater the resolution of the three-dimensional object data is, the more intensively these data are segmented, i.e. the more often they are divided into segments. In the segmentation, the 3D detail levels that are to be segmented are all cut with the same segment edges. This means that the 3D detail levels are each cut into segments at the same location and a segment edge of a 3D detail level with a low resolution also exists in a 3D detail level with a higher resolution. These segment edges are essentially identical. They are not absolutely identical since the object is slightly deformed locally by the reduction of the resolution in the different detail levels so that the corresponding segment edges can differ slightly from one another, even if they have been cut with the same plane.

The three-dimensional object data of the individual data levels that have been segmented in this way then have level textures assigned to them, wherein each level texture has a resolution for each detail level that is proportional to the respective 3D detail level. In other words, coarse three-dimensional object data of a 3D detail level have a correspondingly coarse level texture assigned to them.

The level textures can be generated using conventional reduction methods for reducing the resolution of two-dimensional images based on the texture contained in the original data. The level textures can, however, also be generated through re-projection from the original data onto the respective segments.

These segmented 3D detail levels form a hierarchical data structure wherein a segment of a 3D detail level with a low resolution can be assembled from multiple segments of a 3D detail level with a higher resolution, whereby there is a unique assignment throughout the different detail levels.

The invention is based on the realization that the generation in advance of three-dimensional object data that are reduced with different intensities for the different detail levels and the subsequent segmentation of the three-dimensional object data of different resolutions into the segments in the vicinity of the segment edges requires significantly fewer points in order to correctly reproduce the three-dimensional geometry of the corresponding object than if three-dimensional object data were first divided into a multitude of small segments and then the segments were assembled to form larger segments for the other detail levels or hierarchies. With the method according to the invention, if the three-dimensional object data are embodied as a mesh, then for the two segments that are to be generated, it is entirely sufficient to place a respective vertex at each intersecting point between a sectional plane and a mesh line connecting two vertices.

In the conventional methods for generating hierarchical data structures, the three-dimensional object data are first divided into a multitude of small segments and then the other detail levels or hierarchies of the small segments are assembled to form larger segments. The assembled segments are subsequently reduced in resolution. In this connection, however, a multitude of points must be provided at the edges of the segments (=oversampling) so that the contour of the individual segments in the region of the assembled edges exactly matches the contour of the edges of the smaller segments. Otherwise, the reduction method would result in significant deviations in the region of the assembled edges. This oversampling results in a considerable quantity of data, which complicates the processing of three-dimensional objects using computers with low computing power such as mobile end devices.

Because the three-dimensional object data are first reduced in resolution throughout the entire object, when the three-dimensional object data are divided into the individual segments, there are points along the edges in the respective resolution that very realistically reproduce the contour or geometry of the respective object along the edge at the respectively desired resolution. As a result, it is also possible to select a density of points along the respective segment edges that corresponds to the respective resolution.

Also of importance is the fact that the respective detail levels are assigned level textures with a correspondingly reduced resolution. Textures inherently include a multitude of pixels and thus represent a large quantity of data. The quantity of data can therefore be reduced by correspondingly reducing the level textures in the detail levels.

In connection with textures, the term "resolution" means the number of pixels per unit length. A texture can have two different resolutions in two directions that are orthogonal to each other. As a rule, though, textures have the same resolution in the directions that are orthogonal to each other. In connection with three-dimensional object data, the term "resolution" means a number of vertices per unit volume, wherein a vertex is a corner point or apex point of a mesh that is used to display the three-dimensional object. The resolution, however, can also be defined as the number of edges that extend between the individual vertices per unit volume. If a 3D object is represented not by means of a mesh, but instead for example by means of a point cloud, then the resolution can be defined as points per unit volume.

Individual method steps can be swapped in their chronological sequence as long as this has no effect on the hierarchical data structure generated thereby. It is thus possible, for example, for the segments that are respectively assigned to a node to be removed from the respective list prior to the assignment to the respective node. When steps a) and b) are performed, this increases the number of lists. All levels of parent and child nodes can be processed more or less simultaneously or also, child nodes and child nodes thereof taken from particular lists can be processed before the content of other lists is segmented. This has no influence on the hierarchical data structure that is generated thereby. However, the individual 3D detail levels must first be generated and then segmented because a subsequent reduction of the resolution of individual segments has the above-explained disadvantage that it is necessary to provide a high density of points (vertices) along the edges of the segments, which conflicts with reducing the quantity of data.

In a preferred embodiment, the segment edges of adjacent segments of the 3D detail levels are selected so that they overlap one another slightly. In an image synthesis (rendering) in which individual segments are assembled to form an image, this ensures that a uniform, smooth transition between individual segments is achieved and the segment edges are not visible in the image.

This also avoids the occurrence of gaps between the segment edges. The overlapping can cause the occurrence of z-fighting artifacts at the overlapping points. These can be prevented by means of a slight offset of the points at the overlapping segment edge, for example in that the points are offset in the direction of the segmentation plane. The offset is formed by the fact that the free edges of the overlapping segments are bent slightly toward the rear when viewed from the visible side of the respective segment. This produces a clear, generally consistent boundary line between the two segments.

Instead of an overlapping, the segments can also be extruded at the segment edges. In this case, the segment edges are elongated toward the rear when viewed from the visible side of the respective segments. As a result of this, at the adjacent segment edges, it is not a hole that is visible, but rather the extruded section.

Preferably, the three-dimensional object data are formed from a 3D mesh, which respectively consists of triangular mesh cells.

With the segmentation of the 3D detail levels that are to be segmented, they are each cut into i segments. For example, i can be a whole number between 2 and 10. If i equals 2, then the resulting tree structure is a binary tree in which each parent node has two child nodes. If the value of i equals 8, then the resulting tree is an octree in which eight child nodes are assigned to each parent node.

The value of i can be always constant. It is, however, also possible that the number i of segments to be produced is adapted in such a way that each segment in a detail level requires approximately the same quantity of data for the description of the respective segment. For example, it is possible to vary the value of i in subsequent executions of step a) and/or to vary the value of i for the individual lists of segments within a step a).

It is also possible for individual segments with a high resolution to be discarded, particularly if their quantity of data for describing the respective segment is below a particular threshold value and the respective segment is a so-called leaf segment, which is positioned at the end of a branch of the structure tree. As a result of this, individual branches can be shortened so that the structure tree has different depths in some regions.

The method can be embodied such that before the generation of multiple levels of the three-dimensional object data at different resolutions, the number n+1 of detail levels is determined by determining the minimum number n+1 of detail levels in which the quantity of data required to describe the segments with the highest resolution lies below a predetermined threshold value. As a rule, the maximum resolution corresponds to the resolution of the original data; naturally, the original data can be pre-processed as needed. Original data are thus the data describing the three-dimensional object that exist at the beginning of the method according to the invention.

The necessary quantity of data of the segments with the highest resolution can be defined differently. For example, this can be done by using only the quantity of data that is used to describe the three-dimensional object data or by taking into account only the quantity of data of the texture of the respective segment or also by taking into account both quantities of data in combination. Since in the individual sub-levels, the resolution of the three-dimensional object data is proportional to the resolution of the texture, if the quantity of data of the three-dimensional object data, the texture, or the combined quantity of data is used, then the differences in the result of the calculation of the number n+1 of the detail levels are small.

The three-dimensional object data are preferably represented by means of a mesh structure, which has mesh points (=vertices), which are connected with mesh lines. The three-dimensional object data can also be embodied of SDFs (signed distance fields), heightmaps, NURBS structures, point clouds, or 3D data projected in 2D textures.

With the present invention, as has already been explained above, existing three-dimensional objects, which have and possibly consist of three-dimensional object data and a texture that is mapped onto the object data, can be converted into a hierarchical data structure.

For this purpose, if in the existing three-dimensional object data, there are multiple objects that are in reality connected, but have been split due to processing steps, then it can be advantageous for these to be combined in advance to form a single object. In this case, for example, closely adjacent vertices of the different objects are respectively combined into a shared vertex.

It can also be advantageous for the texture that is mapped onto the three-dimensional object data to be separated out from it so that the three-dimensional object data and the texture can subsequently be processed separately.

According to another aspect of the present invention, a hierarchical data structure of a three-dimensional data structure is provided, comprising three-dimensional object data and textures mapped onto them, wherein the hierarchical data structure is subdivided into multiple detail levels in which the three-dimensional object data are respectively divided into one or more segments and wherein the resolution of the three-dimensional object data and of the corresponding textures of the respective detail level is greater the smaller the segments of the individual data levels are.

This hierarchical data structure can feature the fact that in detail levels, which comprise multiple segments, the segments overlap one another or are extruded at the segmentation edges.

In an image synthesis (rendering) in which individual segments are assembled to form an image, this ensures that a uniform, smooth transition between the individual segments is achieved and the segment edges are not visible in the image. This also avoids the formation of gaps between the segments and the formation of z-fighting artifacts.

The hierarchical data structure can also feature the fact that the three-dimensional object data have segments with segment edges, wherein the segment edges of a segment of a detail level with a low resolution also exists as segment edges in all of the detail levels with higher resolutions. Since all segment edges of a segment with a low resolution also exist in segments with a higher resolution, individual segments with a low resolution can always be exactly assembled from multiple segments of higher resolution. As a result, in the data transfer, a segment with a low resolution can always be substituted by multiple segments with a higher resolution, wherein the substitution of segments with a low resolution by multiple segments with a higher resolution can take place entirely independently for the individual segments with a low resolution. This enables the section-by-section transmission of data with different resolutions to an end device and the section-by-section substitution therein of the corresponding data in the respective three-dimensional object.

This data structure is preferably obtained in that first, the three-dimensional object data are converted into multiple levels with different resolutions, which are referred to as 3D detail levels. The 3D detail levels are then segmented by respectively using the same planes to cut all of the 3D detail levels that are to be segmented. If the three-dimensional object data are embodied as a mesh, then for the two segments that are to be produced, it is sufficient to place a respective vertex at each intersecting point between a sectional plane and a mesh line connecting two vertices.

According to another aspect of the present invention, a method for streaming a hierarchical data structure of a three-dimensional data structure is provided, as has been explained above. The three-dimensional data structure is transmitted from a server or local storage medium to an end device on which the three-dimensional hierarchical data structure is displayed by means of a display device, wherein the hierarchical data structure comprises three-dimensional object data and textures mapped onto them and is subdivided into multiple detail levels in which the three-dimensional object data are respectively divided into one or more segments and wherein the resolution of the three-dimensional object data and of the corresponding textures of the respective detail level is greater the smaller the segments of the individual data levels are. In the end device, a point of view, a viewing direction, and a field of view are established, which are to be used for viewing the three-dimensional data structure and which are referred to collectively below as the "camera" so that a two-dimensional projection of the three-dimensional data structure from the point of view of the camera can be displayed on the end device.

This method features the fact that with a change of an image detail from an actual state to a target state, the detail level of the hierarchical data structure that is suitable for displaying the target state is determined, wherein this determination is independent of the data level used in the actual state and individual segments of a detail level with a low resolution are substituted by multiple corresponding segments with a higher resolution and vice versa.

If a target state that differs from the present actual state is selected in the end device, then when streaming conventional three-dimensional objects that have a hierarchical data structure, the respective detail levels would have to be transmitted sequentially until the detail level that corresponds to the desired target state has been reached. The quantity of data to be transmitted is therefore substantial with such a method. Since in the method according to the invention, the determination of the detail level of the target state takes place independently of that of the actual state, it is possible to skip individual detail levels so that only the data of the detail level that is used for displaying the target state have to be transmitted. This significantly speeds up the streaming in comparison to conventional methods.

The determination that is independent of the detail level used in the actual state can preferably be carried out only if the change of an image detail exceeds a predetermined threshold value and otherwise, the adjacent segments in the hierarchy of the data structure are loaded in the change from an actual state into a target state.

For example, such a threshold value can be defined by means of a basic bounding volume. For example, the basic bounding volume can be a box that exactly envelops the entire segment. A child bounding volume is then selected so that it is scaled by a magnification factor X relative to the basic bounding volume. Another parent bounding volume is selected so that it is scaled by a magnification factor Y relative to the basic bounding volume. Y is greater than X.

In order to display the three-dimensional object data on a conventional display device, they are mapped onto a two-dimensional image by means of a corresponding function. This mapping is established by means of a viewing direction, a point of view, and viewing angle. The viewing direction, the point of view, and the viewing angle are collectively referred to simply as a virtual camera.

The child bounding volumes and parent bounding volumes are selected so that if the virtual camera, which has a fixed viewing angle, is moved into the region of the child bounding volume, then instead of the current segment, the corresponding child segments are to be displayed. By contrast, if the camera is moved out of the region of the parent bounding volume, then the corresponding parent node is to be displayed. This is only the case, though, if the camera is moved out of all of the parent bounding volumes of the segments of a detail level.

Corresponding parent and child bounding volumes can be provided for all of the segments of the different detail levels. If the virtual camera is suddenly placed in a child bounding volume of a segment that is positioned several levels below the current segment in the tree structure, then the corresponding detail levels can be skipped. The same is conversely true if the virtual camera is moved out of the parent bounding volumes of segments that are positioned several layers above the current segment or node of the tree structure. Here, too, detail levels can be skipped.

An image detail is established by means of the distance of the point of view and by means of an angular range, i.e. the viewing angle. As a rule, the imaginary camera is assumed to have a fixed viewing angle range so that the image detail depends solely on the distance. Basically, however, it would also be possible to vary the viewing angle range. With a change of the image detail with a fixed viewing angle range, the threshold value can be defined, for example, by means of a predetermined distance of the pixel from the 3D object. Since the 3D object is naturally not planar, the distance can be specified, for example, as the minimum, maximum, or average distance from the 3D object.

Preferably, as explained above, a child bounding volume is used, which is positioned around the active node and if the camera is positioned in the child bounding volume, then the corresponding segments of the child node or nodes are loaded onto the end device and/or a parent bounding volume is used, which is positioned around the active node and if the camera is positioned outside of the parent bounding volume, then the corresponding segment of the parent node is loaded onto the end device.

These bounding volumes are also referred to as bounding boxes.

Since the parent bounding volume is a little bit larger than the child bounding volume, a loading procedure does not take place with each change of the image detail; instead, such a loading procedure takes place only if the image detail has been changed significantly. This corresponds to a fuzzy logic.

BRIEF DESCRIPTION OF THE DRAWINGS

The invention will be described in greater detail below by way of example based on the drawings. In the drawings.

DETAILED DESCRIPTION OF THE PREFERRED EMBODIMENTS

With the method according to the invention, a hierarchical data structure is generated based on a three-dimensional object. The three-dimensional object has and possibly consists of three-dimensional object data, which describe the contour of the object, and a texture that is mapped onto the object data and reproduces the chromatic design of the surface of the object. The generation of such a three-dimensional object is known, for example, from U.S. 10,950,041 B2; the method described herein is particularly suitable for producing underwater maps, but can also be used for describing other objects such as buildings.

The method can be carried out by means of software on a computer. The method can, however, also be implemented by means of hardware especially embodied for this purpose.

Figure 1:
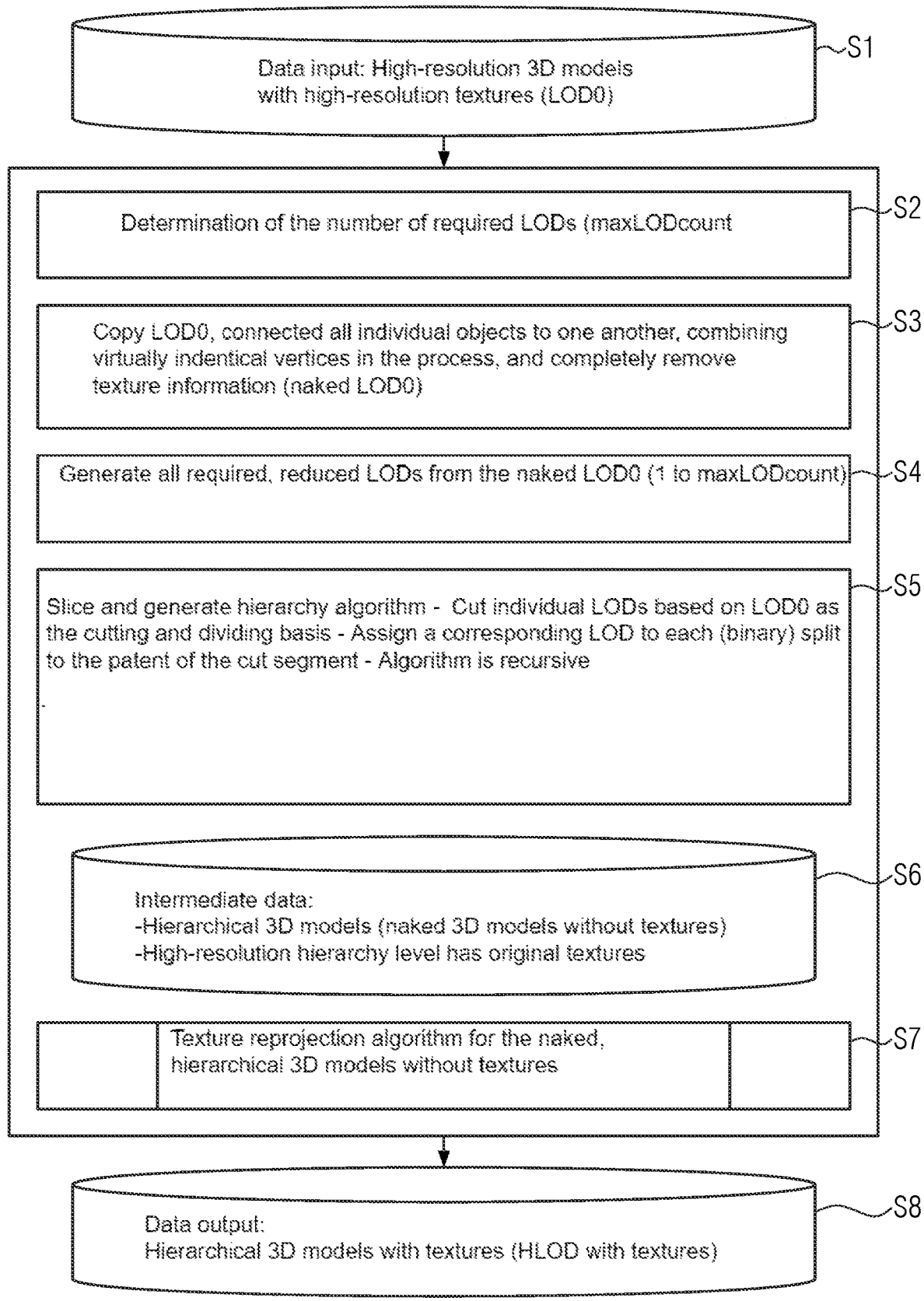
FIG. 1 shows a flowchart of an exemplary embodiment of a method for generating a hierarchical data structure of a three-dimensional object.

The data input includes a three-dimensional object, in particular a high-resolution three-dimensional object, having the three-dimensional object data and the texture that is projected thereon (step S1 in FIG. 1). Such a texture can comprise multiple images, which are mapped onto different regions of the three-dimensional object data.

Figure 3A:
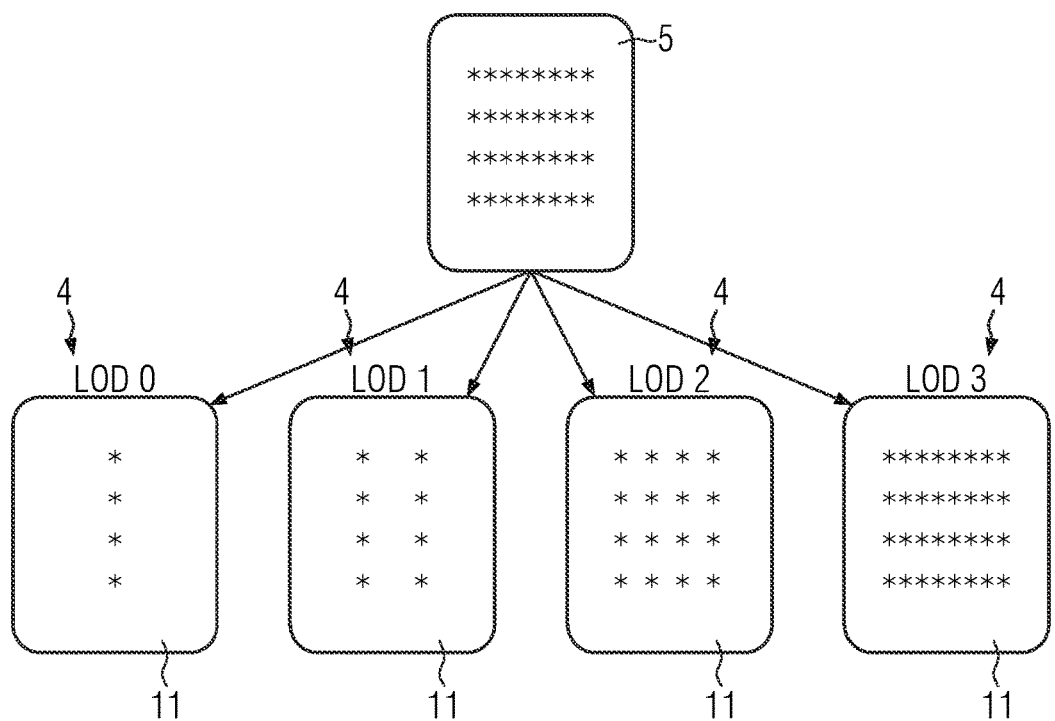
Figure 3B:
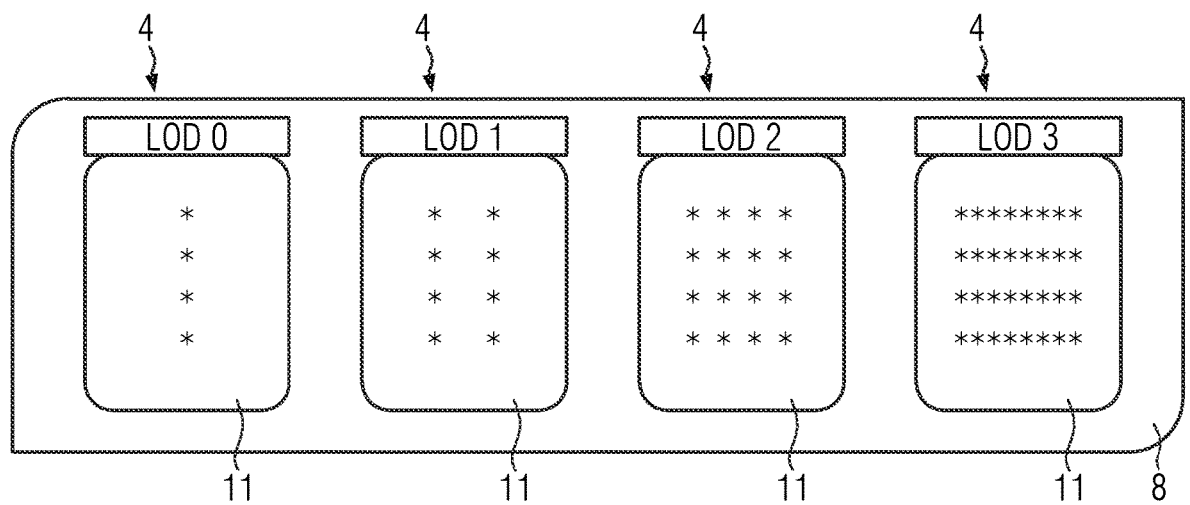
Figure 3C:
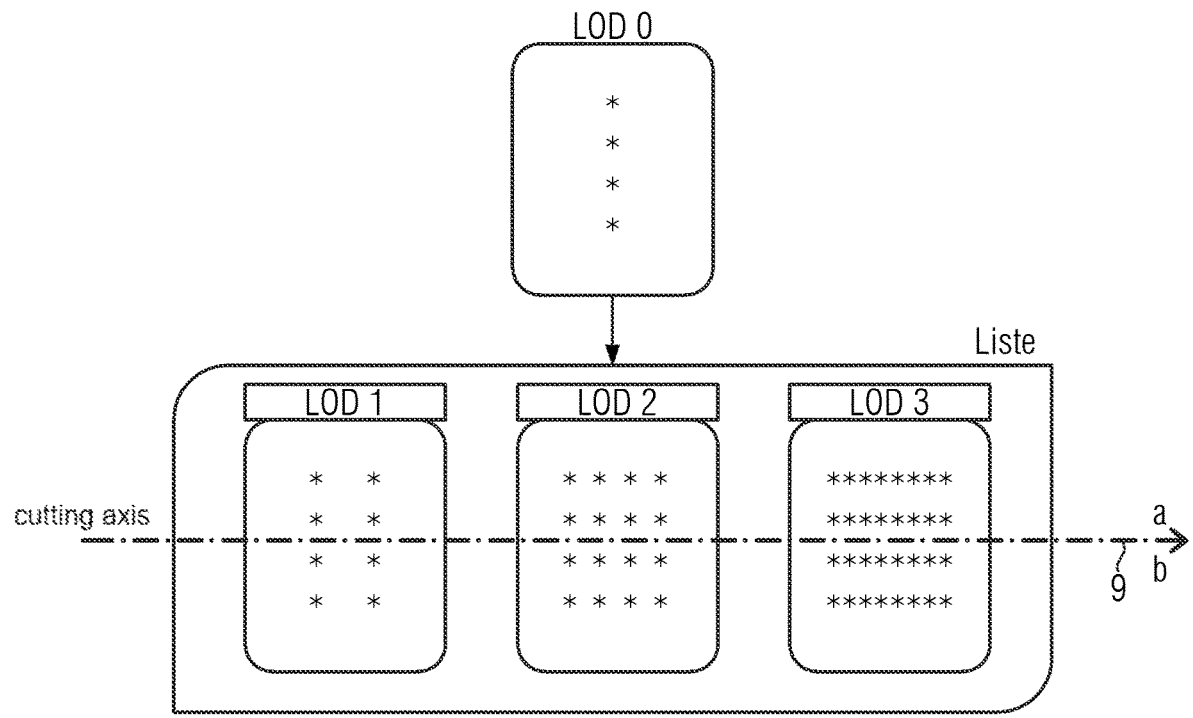
Figure 3D:
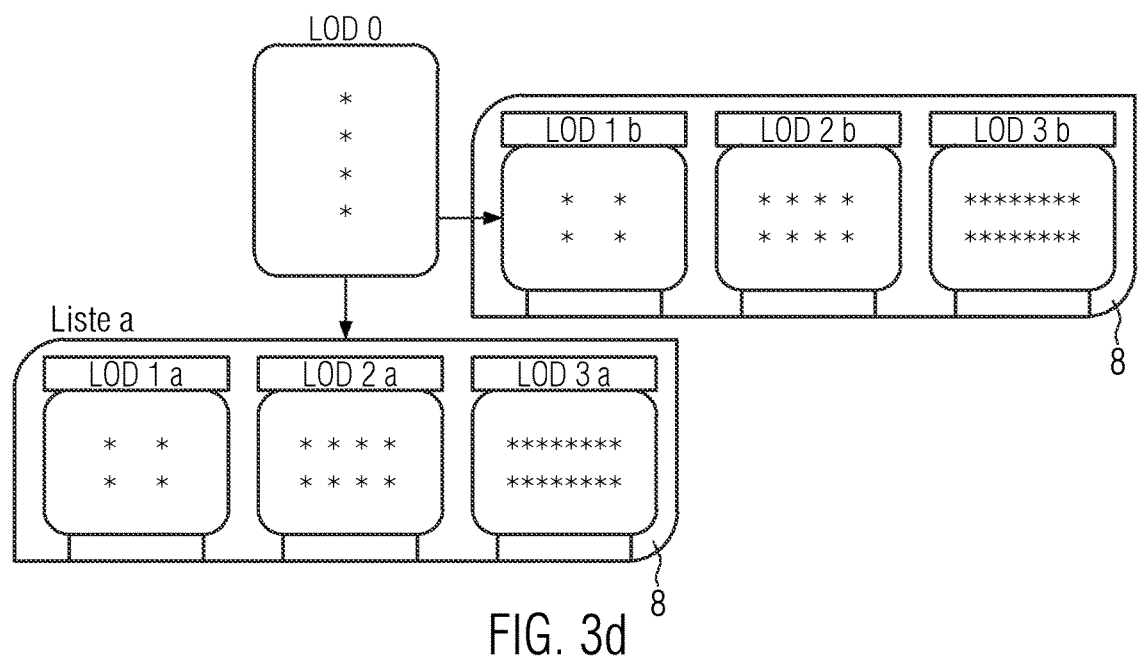
Figure 3E:
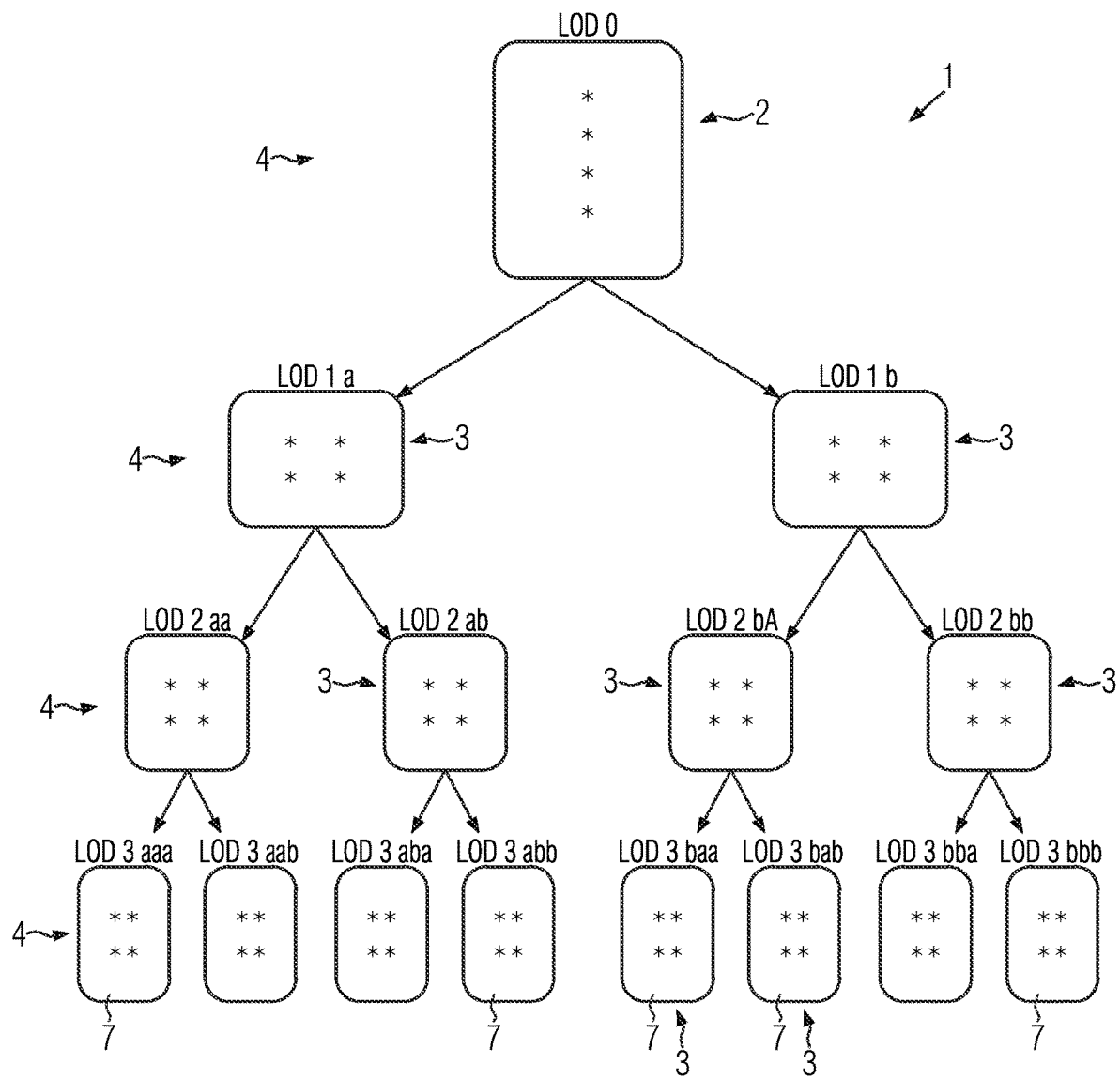

The hierarchical data structure to be generated is a tree structure 1 with a root node 2 and nodes 3 that are dependent thereon, which are organized in several levels 4, which each constitute a detail level 4 (e.g. FIG. 3e). At least a part of the three-dimensional object 5 is assigned to each node 2, 3, i.e. the corresponding three-dimensional object data and the texture of the respective part of the three-dimensional object 5 that is mapped onto them are assigned to each node 2, 3 of the finally generated data structure.

The entire three-dimensional object is assigned to the root node 2. The nodes that are dependent thereon each have assigned to them parts of the three-dimensional object, which are referred to below as segments 6 of the three-dimensional object.

The more branched the nodes 3 in the tree structure 1 are, the smaller the segments 6 are. The smaller the segments 6 are, the higher their resolution of the three-dimensional object data and the higher the resolution of the texture that is mapped onto them so that the quantity of data that is assigned to the individual nodes 3 for describing the respective segments of the three-dimensional object is approximately the same.

The nodes positioned at the ends of all of the branches are referred to below as "end nodes" 7. The end nodes have the segments 6 of the three-dimensional object at the greatest resolution, which as a rule corresponds to the resolution of the original data of the three-dimensional object.

Nodes 3 that are subordinate to a certain other node are referred to as child nodes of this certain other node whereas nodes to which the child nodes are subordinate are referred to as parent nodes.

Thus starting from the root node 2 in the direction toward the end nodes 7, the individual detail levels 4 have increasingly smaller segments with a respectively higher resolution.

The detail levels are also referred to as LODs (levels of detail). The tree structure 1 has n+1 detail levels; the detail level with the lowest resolution, which is assigned to the root node 2, is referred to as 3D detail level 0 and the segments, which are assigned to the end nodes 7, constitute 3D detail level n.

Basically, the aim is to keep the quantity of data of the segments of the three-dimensional object assigned to a respective node 3 within a predetermined range that can be processed well and quickly with the available hardware and on the other hand, depicts as much of the three-dimensional object as possible. If the three-dimensional object is to be transmitted to a mobile end device such as a mobile phone via a wireless data connection and displayed thereon, then it has turned out to be advantageous for the quantity of data of the respective three-dimensional object data of a node 3 to be in the range from a few hundred kilobytes to approx. 4 megabytes per segment. In mesh points, this corresponds to approx. 100 bis 20,000 mesh points per segment or node. The optimum texture magnitude per segment is n pixels, for example between 1024×1024 and 4096×4096, in order to achieve a visually appealing quality. This applies to the currently conventional hardware and the currently conventional network data throughput. With increasing computing power and data transmission rates, larger quantities can also be advantageous in this context.

In the present exemplary embodiment, the three-dimensional object data are displayed by means of a mesh structure that consists of triangular mesh cells, which are each defined by means of mesh points, which are also referred to as vertex (singular) or vertices (plural), and by means of mesh lines that connect the adjacent mesh points. The three-dimensional object data can also be embodied of SDFs (signed distance fields), heightmaps, point clouds, or 3D data projected in 2D textures.

It has turned out that the overall quantity of data that is assigned to a node 3 is approximately proportional to the number of mesh points or mesh lines of the respective segment so that in order to estimate the quantity of data assigned to a node 3, it is sufficient merely to count the mesh points or mesh lines that are contained in the segment that is assigned to the node 3.

In order to determine the number of required detail levels 4 (step S2 in FIG. 1), it is thus possible to take into account solely the mesh points or mesh lines and based on them, to determine how often the original data of the three-dimensional object are to be subdivided until the quantity of data assigned to the end nodes 7 is below a predetermined threshold value. This threshold value can consist of the number of mesh points or the number of mesh lines or also the overall quantity of data, consisting of the data for describing the three-dimensional object data as well as the texture of the respective segment. This determination also includes how many child nodes are dependent on a parent node. In a binary tree, two child nodes depend from each parent node, whereas in an octree, eight child nodes depend from each parent node. The number of child nodes of the parent nodes can, however, also vary individually, as will be explained in greater detail below. There are, however, empirical values for this so that an appropriate average or median value for the number of child nodes of the parent node can be taken into account when determining the number of detail levels.

The three-dimensional object is subjected to a preprocessing (step S3). For example if the three-dimensional object is supposed to consist of multiple individual objects, these are connected to one another in this preprocessing. This can also be carried out in that vertices of different objects, which are positioned very close to each other, can be combined into a single vertex. Also in this preprocessing, the three-dimensional object data and the texture that is mapped onto them are separated from each other and the two are stored separately. These three-dimensional object data thus form a "naked" object.

Based on the naked object, for each detail level (LOD0 to LOD3 in FIG. 3a), a reduced object 11 of the three-dimensional object data is generated, wherein the resolution of the individual data levels 4 is reduced step by step from detail level to detail level so that the detail level with the lowest resolution, which is referred to as 3D detail level 0 (LOD0 in FIG. 3a), comprises a quantity of data that approximately corresponds to the quantity of data of a segment 6, which is assigned to one of the end nodes 7. Since the quantity of data is approximately proportional to the number of mesh points or mesh lines, the number of mesh points or mesh lines of 3D detail level 0 is approximately equal to the number of mesh points or mesh lines of the individual segments 6 of the end nodes 7 or of 3D detail level n (LOD3 in FIG. 3a). The gradation of the reduction of the resolution of the individual data levels also corresponds to the number of child nodes that depend on the respective parent nodes relative to the respective detail level. In order to generate the different three-dimensional object data of the different detail levels (=reduced objects 11), the original three-dimensional object data can be copied as often as the number of detail levels; then each copy of the three-dimensional object data is reduced using an intrinsically known reduction method to reduce the resolution so that the desired gradation of the resolution in the individual detail levels is obtained. The three-dimensional object data that are established in this way are referred to below as 3D detail level 0 (lowest resolution) through 3D detail level n (highest resolution; corresponds to the original data 14). These 3D detail levels, i.e. the naked three-dimensional object data of the respective detail level, respectively reproduce the contour of the same three-dimensional object; but they may differ from one another slightly because of the different resolution.

In the next step, the individual 3D detail levels are cut into their segments 6 (step S5 in FIG. 1). The segmentation will be explained in greater detail below in conjunction with FIG. 2. In the segmentation, the 3D detail levels or more precisely, their segments, are each cut with the same cutting surface 9 or sectional plane so that a segment edge 10 of a detail level with a low resolution always also exists as a segment edge 10 in a detail level with a higher resolution. The segments that are cut in this way are allocated to the nodes 3 of the tree structure 1.

A naked hierarchical data structure of the three-dimensional object data is thus obtained as an intermediate result (step S6 in FIG. 1).

Then a texture from the original texture is projected onto the individual segments of the different detail levels (step S7 in FIG. 1); the resolution of the texture is reduced in accordance with the resolution of the three-dimensional object data of the respective segments. Consequently, the maximum resolution of the texture, i.e. the original data of the texture, is projected onto the segments 6 of the end nodes 7. Onto the 3D detail level 0 that has the lowest resolution, the texture data with the correspondingly lowest resolution are projected. The resolution of the texture data is approximately proportional to the resolution of the three-dimensional object data of the respective segments. By means of this, the individual nodes 3 have segments assigned to them that comprise approximately the same quantity of data.

The hierarchical data structure 1 that is generated in this way is output in step S8 and is available for the further processing, for example a streaming procedure.

Figure 2:
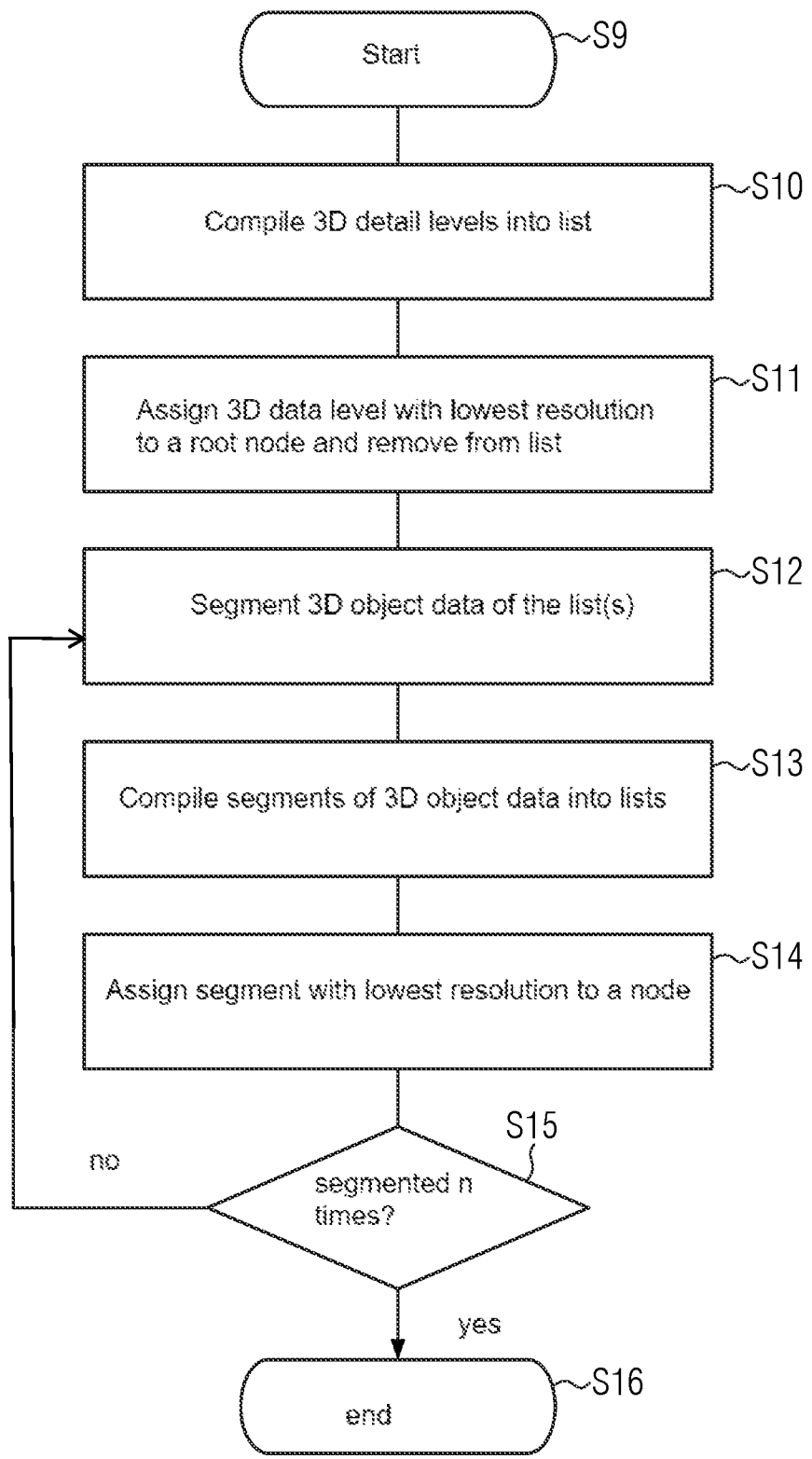
FIG. 2 shows a flowchart of the segmentation of the 3D object data of the different detail levels from FIG. 1 in additional detail steps, FIGS. 3a-3e schematically depict different processing steps of a three-dimensional object as it is converted into a hierarchical data structure with the method according to FIG. 1, FIGS. 4a, 4b, 4c, 4d, 4e, 4f, 4g, 4h, 4i, and 4k schematically depict the segmentation of four different detail levels after the individual steps executed in FIG. 2, FIGS. 5a, 5b show a binary tree structure (FIG. 5a) and the corresponding segments of the three-dimensional object data (FIG. 5b)

The segmentation will be explained in greater detail below based on FIG. 2; this sub-process starts with step S9.

Figure 4A:
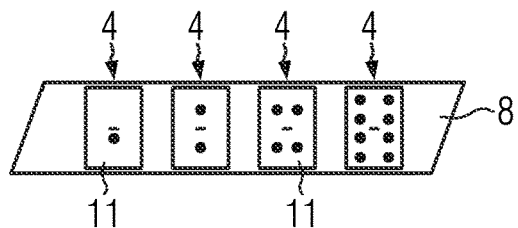

In step S10, the 3D detail levels are compiled into a list 8 (FIG. 3b & FIG. 4a).

Figure 4B:
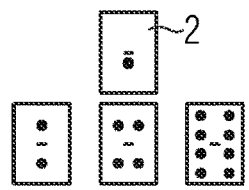

The 3D detail level 0 with the lowest resolution is assigned to the root node 2 and removed from the list (step S11; FIG. 4b).

Figure 4C:
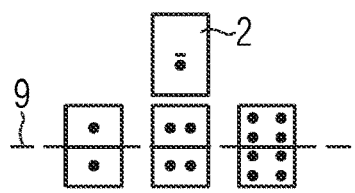
Figure 4D:
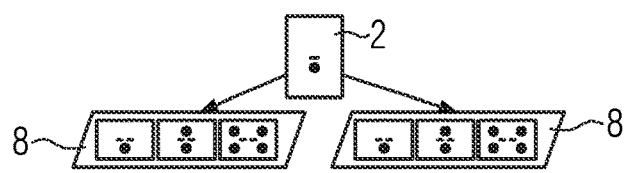
Figure 4E:
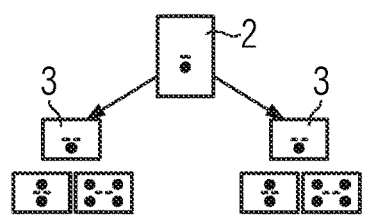

In step S12, the remaining 3D object data of the different detail levels are cut into segments (FIG. 3c & FIG. 4c). In the present exemplary embodiment, they are each cut into two segments. Within the scope of the invention, however, they can also be cut into other numbers of segments, as will be explained in greater detail below. All of the 3D object data from a shared list are cut with the same cutting surface 9. In FIG. 3c, the cutting surface 9 is a plane. The cutting surface 9 can, however, also be a contoured surface and it can be varied for the individual cutting procedures.

Figure 8A:
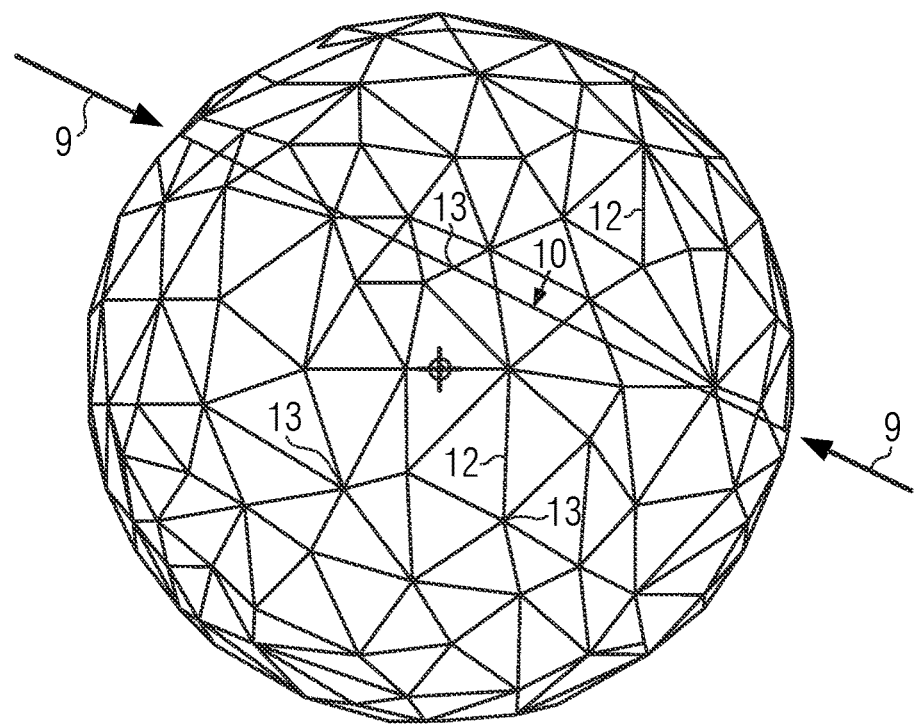

In the present exemplary embodiment, the three-dimensional object data are depicted by means of a mesh. Such a mesh consists of mesh points (=vertices) 13, with adjacent mesh points 13 being connected by means of a mesh line 12. FIG. 8a schematically depicts the cutting of a three-dimensional object in the form of a sphere. At all of the intersecting points of the sectional plane 9 with mesh lines 12, a respective mesh point 13 is generated for the one sphere segment and a mesh point 13 is generated for the other sphere segment. The mesh lines 12 are thus not changed, but only cut at their intersecting point with the sectional plane 9.

Figure 8B:
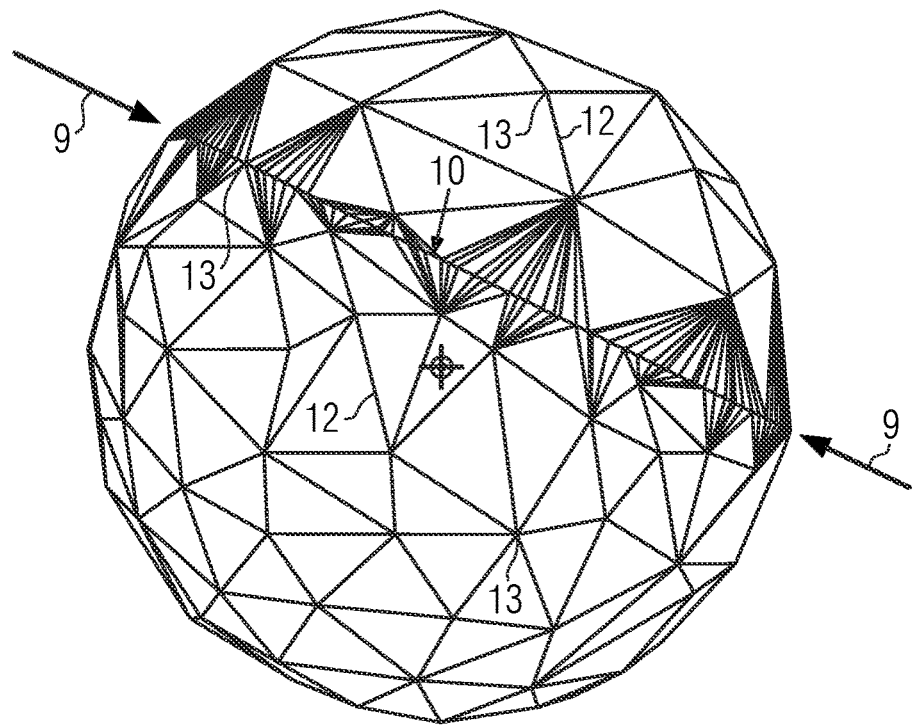

In conventional methods for generating hierarchical data structures (e.g. EP 2747032 A1), the three-dimensional object data are first divided into a multitude of small segments and then the other detail levels or hierarchies are generated by assembling the small segments into larger segments. The assembled segments are subsequently reduced in resolution. In this connection, the cut edges of the individual hierarchies or detail levels coincide exactly; otherwise, the subsequent reduction will generate significant deviations in the region of the edges. FIG. 8b shows how with the oversampling, the cut edge or segment edge 10 is exactly reproduced from the cut edge of the child nodes. Along the cut edges, there is thus a large quantity of points, which results in a large quantity of data. This is avoided with the invention.

In FIGS. 3a-3e, each "*" indicates a certain number of mesh points and in FIG. 4a-4k, each "," indicates a certain number of mesh points. The cutting surface 9 is positioned so that the individual three-dimensional object data are each divided into two segments, which then contain approximately the same number of mesh points.

The segments 6 generated in this way are then compiled back into lists 8 (step S12), the individual lists each comprising the same segments of the different detail levels. These segments each have the same segment edges 10, but they all have a different resolution as a result of which, they can differ slightly from one another in their contour.

The segments with the lowest resolution of the respective lists are each assigned to a node 3 of the tree structure 1. This node 3 constitutes a child node of the parent node to which is assigned the segment from which the present segment has been directly cut. The segment with the lowest resolution in the respective list is removed from the list in this case.

In step S15, a check is performed as to whether the three-dimensional object data have already been segmented n times. If this is not the case, then the process sequence returns to step S12 in which the 3D object data contained in the lists are segmented again; then new lists are created again (step S13) and the segments with the lowest resolution are assigned to a node (step S14).

But if in step S15, it is determined that the three-dimensional object data have already been segmented n times, then the process moves on to step S16, in which it comes to an end.

Figure 4F:
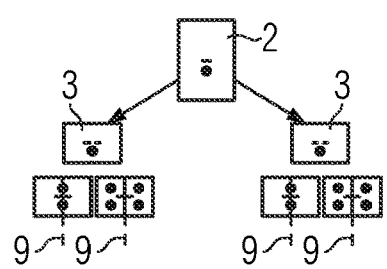
Figure 4G:
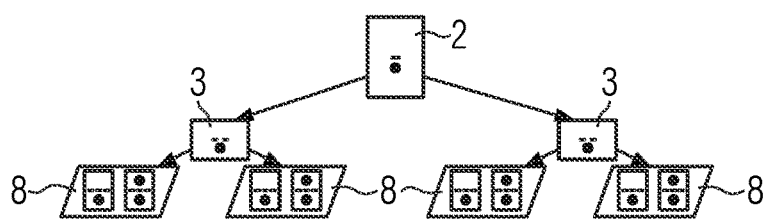
Figure 4H:
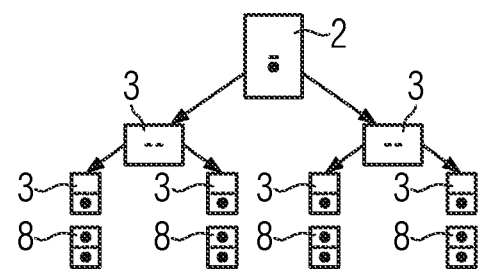
Figure 4I:
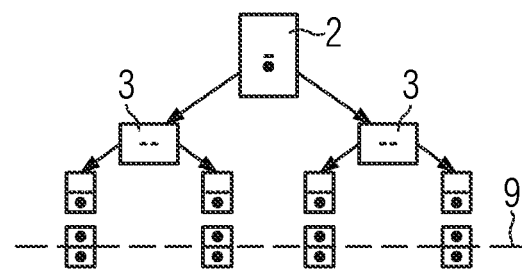

FIGS. 4a-4k show the multiple repetition or iteration of the segmentation procedure; the segmentation of the 3D object data is carried out in accordance with step S12 in FIGS. 4c, 4f, and 4i.

Figure 4K:
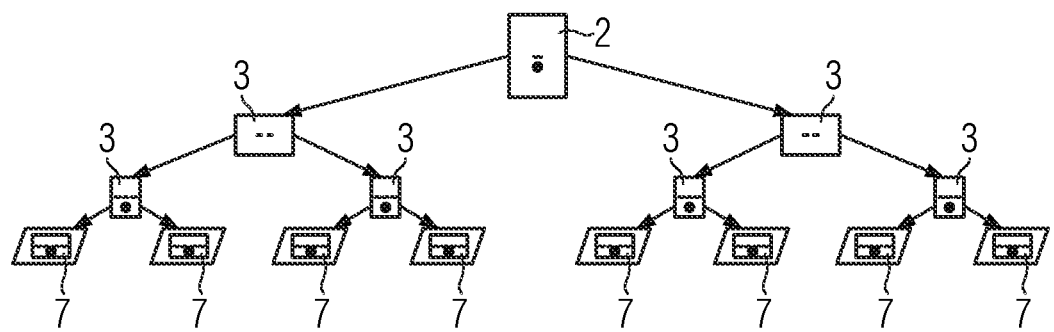

This produces a tree structure of the kind shown in FIG. 3e and FIG. 4k. This tree structure constitutes a binary tree.

Figure 5A:
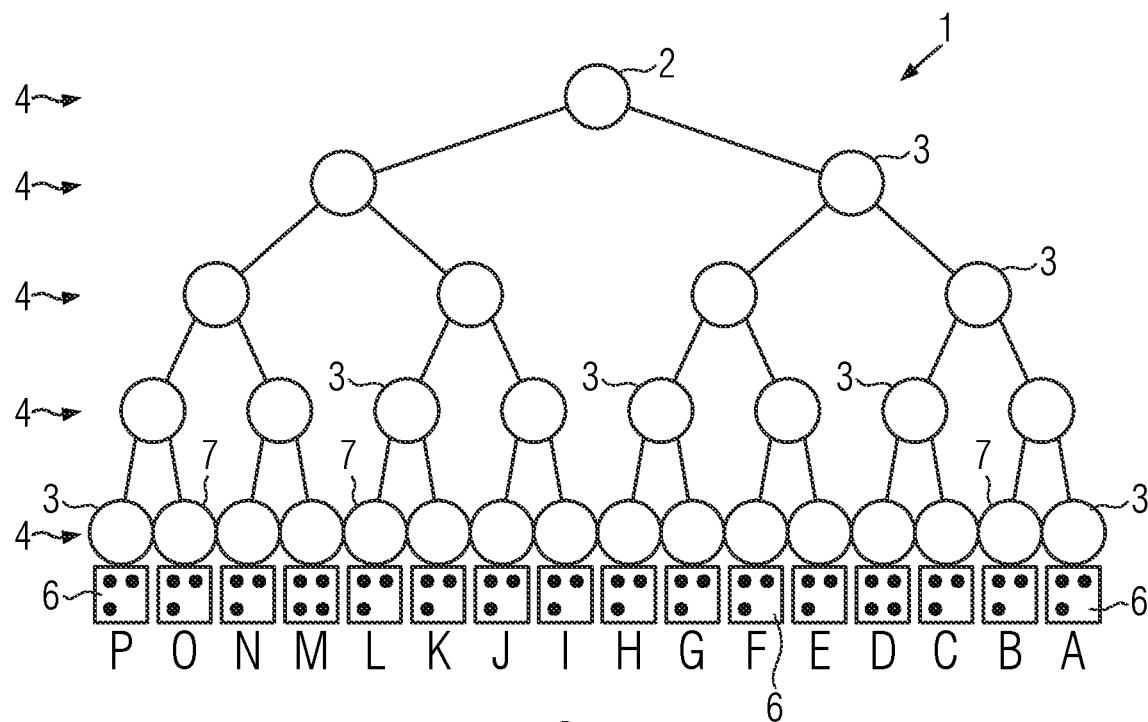
Figure 5B:
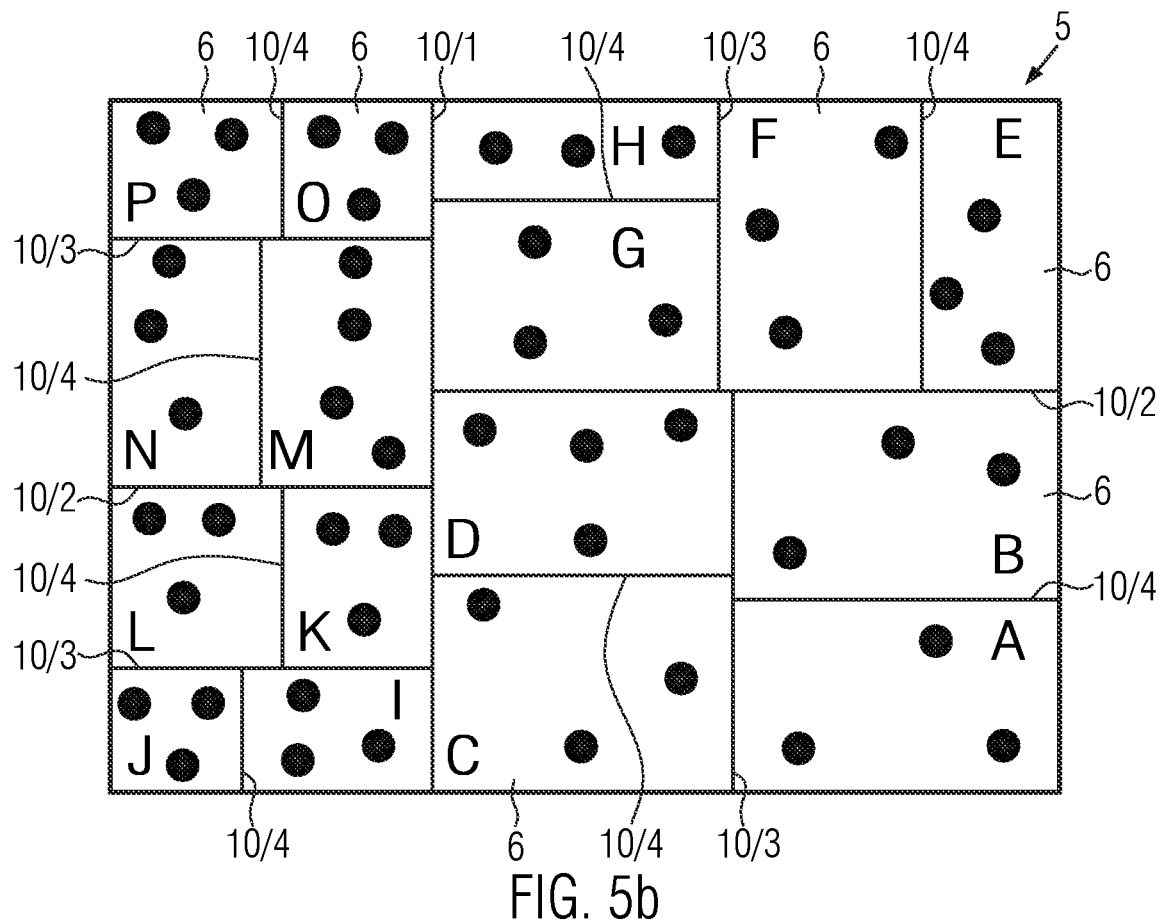

FIG. 5a shows another binary tree in which the segments of the end nodes 7 are schematically depicted and each have multiple points that correspond to a corresponding number of mesh points of the three-dimensional object data. The segments in FIG. 5a are labeled with the letters A-P. FIG. 5b shows a schematically simplified projection of the three-dimensional object data onto a two-dimensional rectangle in which the segments 6 are plotted with their segment edges 10. The segment edge 10/1 was used in the first segmentation procedure, the segment edges 10/2 were used in the second segmentation procedure, the segment edges 10/3 were used in the third segmentation procedure, and the segment edges 10/4 were used in the fourth segmentation procedure. This yielded the segments A-P in the highest resolution in the end nodes 7. As can be inferred from this depiction, the individual segments 6 comprise different numbers of points and thus different numbers of mesh points.

Figure 6A:
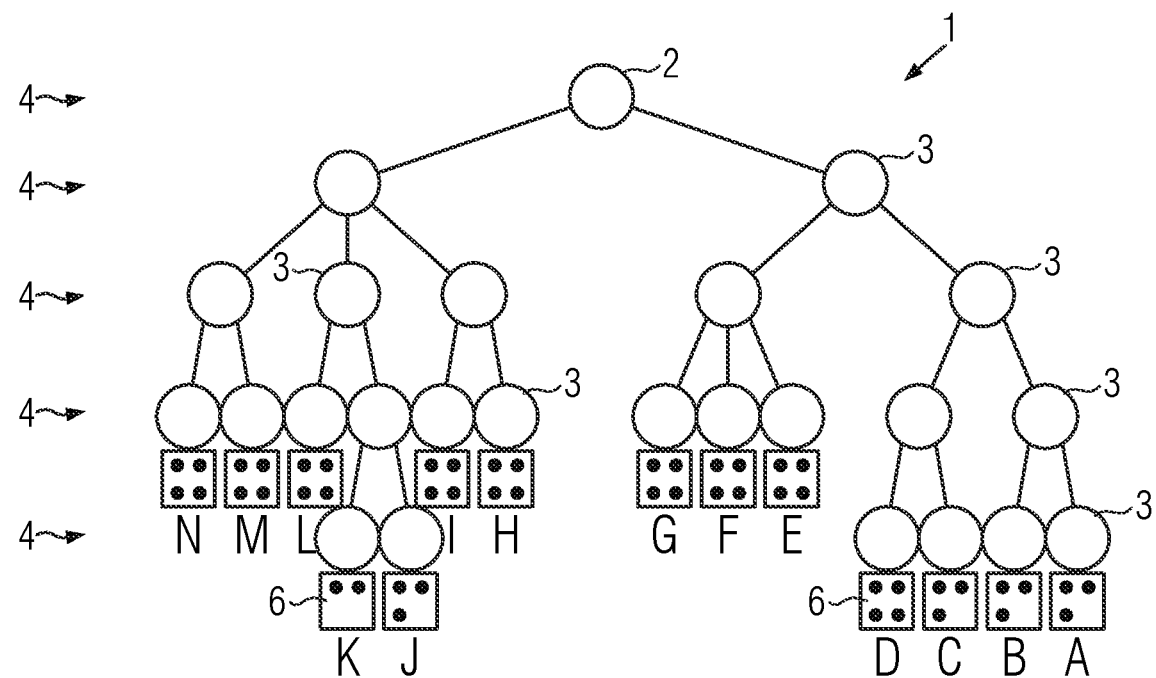
FIGS. 6a, 6b show a tree structure with a variable branching (FIG. 6a) and the corresponding segments of the three-dimensional object data (FIG. 6b)

FIG. 6a shows a tree structure 1 in which the same three-dimensional object is hierarchically structured as in FIGS. 5a, 5b; the tree structure has a variable number of child nodes per parent node. With an adaptive method of this kind, for each parent node, first the number of cutting surfaces 9 is calculated for achieving the most uniform possible distribution of mesh points in the individual segments. For example, this is carried out by means of the following formula:

$$cc = \text{ceil}(\max(\text{boundaries}.X, \text{boundaries}.Y, \text{boundaries}.Z) / \text{secondMax}(\text{boundaries}.X, \text{boundaries}.Y, \text{boundaries}.Z))$$

where cc corresponds to the number of cutting surfaces, boundaries.X, boundaries.Y, and boundaries.Z correspond to the dimensions of the respective bounding volume, in the X, Y, or Z direction, and the function "max" outputs the greatest value of the input and the function "secondMax" outputs the second greatest value of the input, and the function "ceil" rounds the result to whole numbers.

Figure 6B:
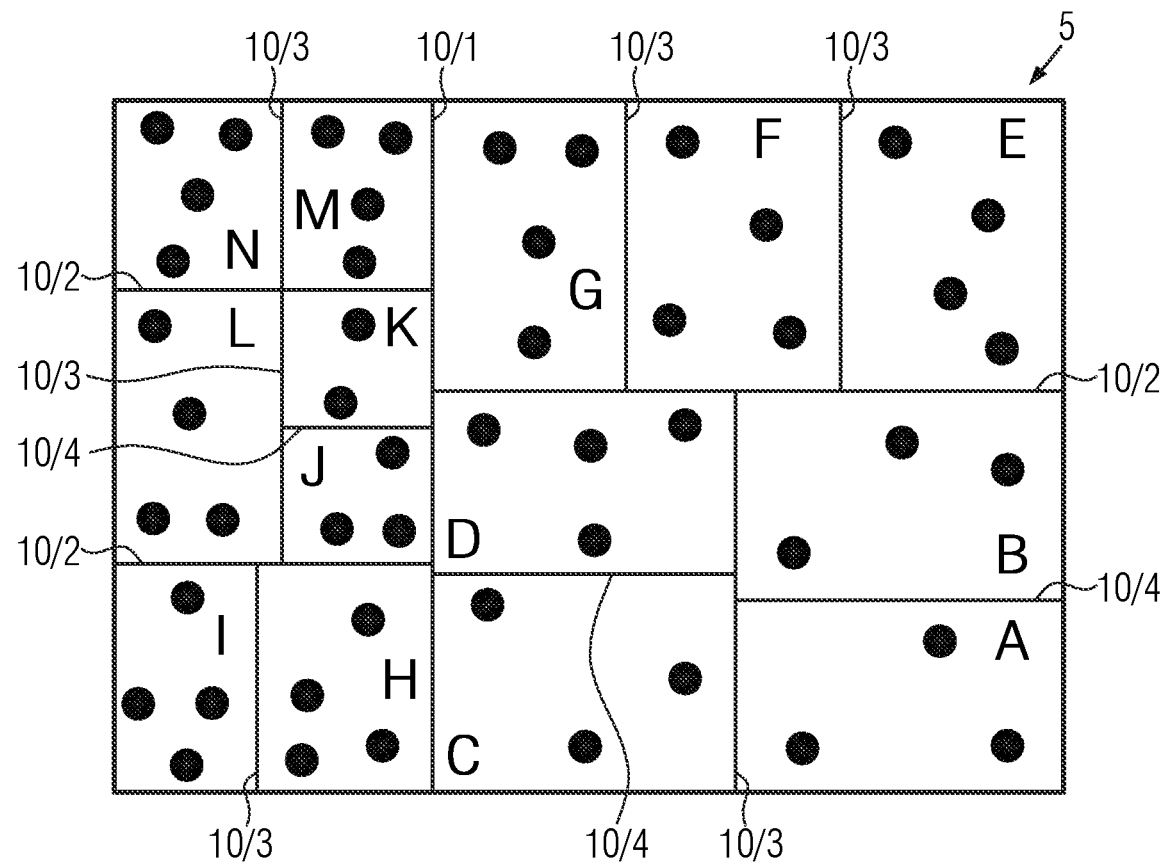

This yields a division of the segments 6 as shown in FIG. 6b in which a more uniform distribution of the quantity of data to the individual segments is achieved with fewer segments overall.

Preferably, the individual segments are embodied in such a way that they slightly overlap one another. Such an overlapping prevents holes from being created along the segment edges between the individual segments 6 due to the slightly different contours of the segments in the different resolutions.

The overlaps can, however, result in so-called z-fighting artifacts in the texture re-projection. This is especially true if it is no longer possible to tell which pixels of the textures are positioned in front or behind from the viewing direction of the camera. In order to eliminate this problem, the mesh points of the cut edges of the different segments can be offset from one another; the offsetting is produced in that the free edges of the overlapping segments are bent backward slightly, viewed in the direction from the visible side of the respective segments.

The cut edges can also be extruded.

The texture re-projection onto the naked three-dimensional object data of the hierarchical data structure preferably occurs exclusively from the high-resolution original data of the original three-dimensional object or from the texture that was separated this data. In the texture re-projection, the resolution of the texture has been adapted in accordance with the resolution of the three-dimensional object data of the corresponding segments and projected onto them. To achieve this, it is possible, for example, to use a projection method of the kind that is known from D. Teixeira, "Baking Normal Maps on the GPU"; in GPU Gems3, No. v. 3 in Lab Companion Service, edited by H. Nguyen and NVIDIA Corporation, Chapter 22, Addison-Wesley, 2008. In the present method, however, it is not the normals, but rather the texture colors of a reference model, namely the original data, that are re-projected onto the respective "naked" segment of the hierarchical structure.

The hierarchical data structure of a three-dimensional object according to the invention is particularly suitable for streaming from a server to an end device on which the three-dimensional hierarchical data structure is displayed by means of a display device, where in the end device, the three-dimensional data structure is converted into a two-dimensional projection from the point of view of a camera and displayed. When a change of an image detail from an actual state to a target state occurs, the detail level of the hierarchical data structure that is suitable for depicting the target state is determined. This determination is independent of the detail level that is used in the actual state; individual segments of a detail level with a low resolution are substituted by multiple corresponding segments with a higher resolution and vice versa.

As a result, it is not necessary for all of the detail levels to be transmitted from the server to the end device. Individual detail levels can be skipped. To achieve this, two buffers are provided in the end device. The detail levels of the actual state are stored in one buffer and the detail levels of the target state are stored in the other buffer. In this case, the buffer of the target state serves as the objective that is to be achieved for the present actual state. The objective is to continuously replace the actual state with the target state as quickly and effectively as possible. For this purpose, there is first a prioritization as to which segments of the target state should be loaded first and which should be loaded last. This basically takes place as a function of the distance from the virtual camera. The closer the segments to be loaded are to the virtual camera, the higher priority they are given. If the segments that are defined in the target state have been loaded for a given node, then the process tries not to unload any no longer needed segments that are not in the actual state. If the segments that have been detected and loaded from the target state geometrically cover the same region that has been covered by the previous segments of the actual state before this one, then these elements can now be unloaded from the actual state and the newly loaded segments from the target state can be adopted into the actual state. This ensures that a projection from the desired viewing direction or for the desired camera is possible at any time, even if it may be necessary to wait a little until the desired resolution is available.

An explanation of how the streaming process takes place is given below based on FIG. 7.

Figure 7:
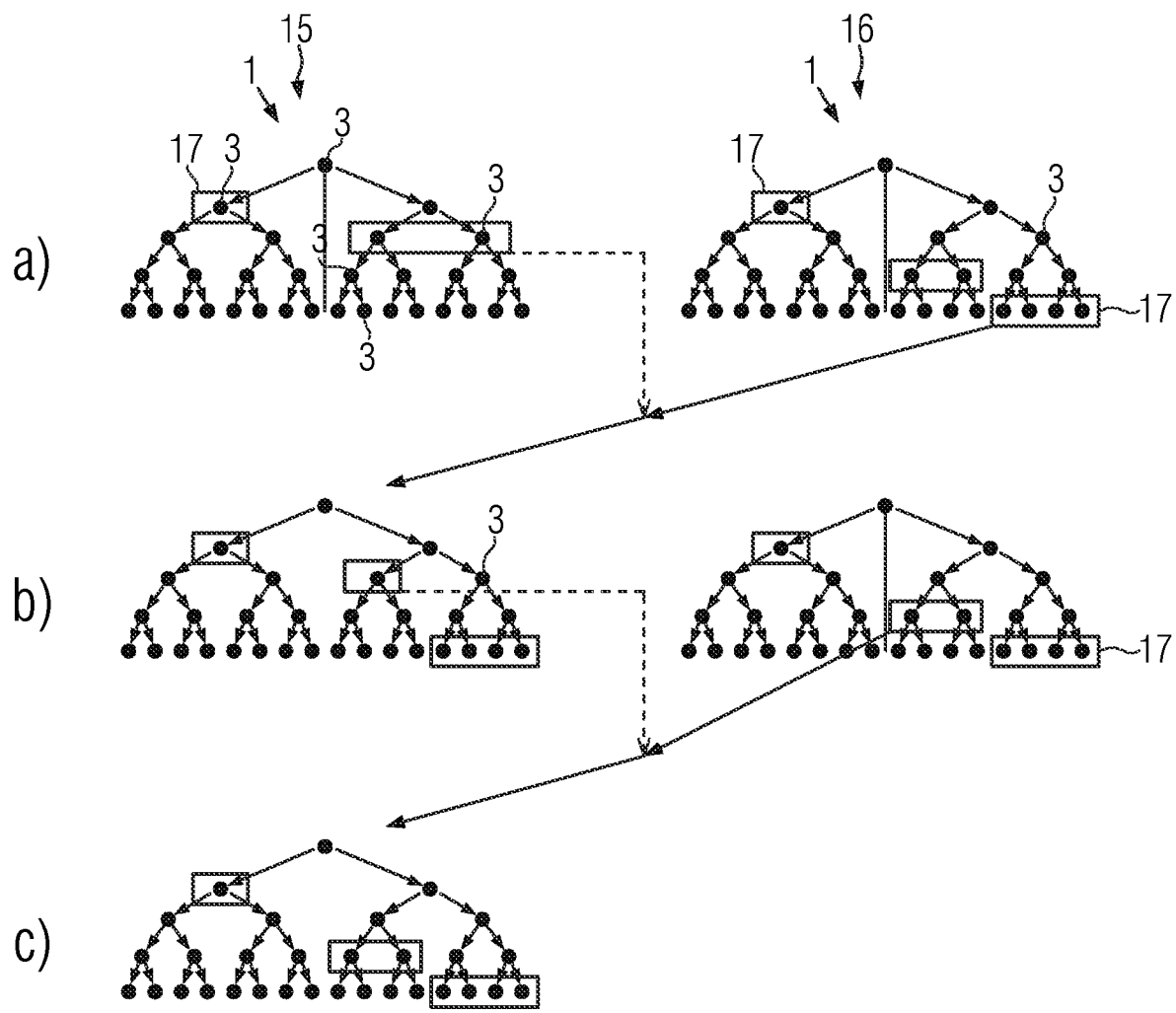
FIG. 7 shows a schematic process flowchart of a method for streaming the hierarchical data structure, FIGS. 8a, 8b each show a three-dimensional object in the form of a sphere, which is cut into two segments.

FIG. 7 shows the buffer 15 for the actual state on the left and shows the buffer 16 for the target state on the right. The buffer 15 for the actual state is loaded with and stores the complete data of the segments to be displayed. By contrast, the buffer 16 for the target state is loaded with only the information that defines which segments are to be displayed. In the present exemplary embodiment, this information is the descriptions of the parent and child bounding volumes of the corresponding segments. The buffer 16 for the target state can therefore also be referred to as the control buffer since it includes an indication of which data are to be loaded into the buffer 15 for the actual state.

Three chronologically successive states a), b), and c) are shown from top to bottom in FIG. 7. These states are each schematically depicted by the tree structure 1; in the respective tree structure 1, the nodes 3 that are stored in the respective buffer 15, 16 are framed with a box 17.

In state a), three nodes 3 with their complete data are stored in the buffer 15 for the actual state; they are positioned relatively close to the top in the tree structure and thus reproduce segments with a relatively coarse resolution.

The buffer 16 of the target state stores the nodes (here: control data in the form of bounding volumes), which are to replace the nodes that were previously stored in the buffer 15. In the present exemplary embodiment, these are child nodes of the first and second generation of two nodes of the buffer for the actual state.

In the transition from state a) to state b), the child nodes of the second generation, which are end nodes of the tree structure 1, are loaded into the buffer 15 for the actual state in accordance with the definition in the buffer 16 for the target state. As soon as all of the child nodes have been loaded into the node 3 that they are supposed to replace, the corresponding node that is to be replaced by the child nodes is unloaded in the buffer 15 for the actual state and only the data of the child node are displayed on the display device. At the transition from the one parent node to the multiple child nodes, the regions for which the data of the child nodes have already been loaded are displayed by means of the data of the child nodes instead of the corresponding lower-resolution data of the parent node. The present exemplary embodiment is thus embodied in such a way that it achieves a fluid transition between the detail levels. In this connection, it is naturally necessary to take into account the fact that the three-dimensional hierarchical data structure is not displayed directly, but rather as a rule only in the form of a two-dimensional projection on the display device. The function for generating the two-dimensional projection is embodied so that it can also implement a combination of data from different detail levels.

In the transition from state b) to state c), an additional node 3 is replaced by two child nodes of the first generation and then unloaded in the buffer 15 for the actual state.

If the buffer 15 for the actual state is fully updated, then the actual state corresponds exactly to the target state, meaning that no further loading operations are required.

The two buffers 15, 16 are located in the end device on which the three-dimensional object is to be displayed. Basically, it is also possible to provide an additional device, which is connected upstream of the end device and in which the two-dimensional projections that are to be displayed on the display device are generated. Then the two buffers 15, 16 must be provided in this device.

As has already been explained, the display of the three-dimensional object is generally provided by means of a two-dimensional projection that is often generated in an intrinsically known way in the end device. Through the provision of these two buffers, it is possible to skip individual levels of a tree structure in the changeover from one display to a different display, as shown above with the changeover from state a) to state b). When increasing the resolution, it is therefore not necessary—as is the case with conventional methods—to successively load all of the nodes that are subordinate to a node that is to be replaced. Instead, individual levels can be skipped and if the respective nodes of the plane have been completely downloaded such that they completely reproduce the region of a higher-level node 3, which can be positioned on multiple levels above in the tree structure, then it is possible without an intermediate step to switch directly to displaying the level of this tree structure.

Since the buffer 16 does not contain the three-dimensional object data of the respective nodes and instead contains only corresponding control data, these data can be changed very quickly and can track a changed viewing direction or a changed viewing angle of an observer.

With this method, when streaming a hierarchical data structure of a three-dimensional object, significantly less data have to be transmitted since individual detail levels can be skipped, which also enables streaming on end devices that do not have a very high computing power or have a data connection with a limited capacity. Conversely, it is possible to quickly display different regions of the three-dimensional object with different resolutions.

On the other hand, if the change of an image detail from an actual state to a target state only changes by a small value, then it can also be advantageous, as in conventional streaming methods, to switch from one detail level to the adjacent detail level. Such a change can, for example, be controlled by means of a child bounding volume and a parent bounding volume, which are each positioned around the respective active node. If the camera is positioned in the child bounding volume, then a switch is made from the detail level of the active node to the next higher-resolution detail level of the corresponding child nodes, whereas a switch is made from the detail level of the active node to the detail level of the next parent node if the camera is supposed to be positioned outside of the parent bounding volume. In this connection, the parent bounding volume is greater than the child bounding volume, which avoids an incessant switching between the detail levels in a manner similar to a fuzzy logic.

For example, the method according to the invention can be used to convert three-dimensional objects, which are created with a CAD program, for example, into a hierarchical data structure and then can be displayed on an end device with a low computing power such as a mobile phone.

The invention can be briefly summarized as follows:

In the method according to the invention, a hierarchical data structure is generated from a three-dimensional object, which has and possibly consists of three-dimensional object data and a texture that is mapped onto the object data, by first converting the three-dimensional object data into multiple detail levels and then segmenting the detail levels, wherein the texture is respectively mapped onto the segments with a corresponding resolution.

While this invention has been particularly shown and described with references to preferred embodiments thereof, it will be understood by those skilled in the art that various changes in form and details may be made therein without departing from the scope of the invention encompassed by the appended claims.

REFERENCE NUMERAL LIST 1 tree structure
2 root node
3 node
4 plane/detail level
5 three-dimensional object
6 segment
7 end node
8 list
9 cutting surface
10 segment edge
11 reduced object
12 mesh line
13 mesh point (=vertex)
14 original data
15 buffer for actual state
16 buffer for target state
17 box Process Steps:
S1 data input
S2 determination of the number of detail levels
S3 preprocessing
S4 generation of the detail levels
S5 segmentation of the 3D detail levels
S6 output of the data structure
S7 re-projection of the texture
S8 output of the hierarchical data structure
S9 start
S10 create list
S11 assignment to root node
S12 segmentation of 3D object data
S13 create lists
S14 assignment of segments to nodes
S15 Segmented n times?
S16 end

The invention claimed is:

1. A method for generating a hierarchical data structure of a three-dimensional object having three-dimensional object data and a texture that is mapped onto the object data, with a predetermined number n+1 detail levels (LOD: levels of detail), wherein the hierarchical data structure is a tree structure with a root node and multiple subordinate nodes, and the hierarchical data structure is embodied with the following steps:

generation of multiple levels of the three-dimensional object data at different resolutions corresponding to the predetermined detail levels, wherein the three-dimensional object data of the detail level with the lowest resolution are referred to as 3D detail level 0 and the three-dimensional object data of the detail level with the highest resolution—which corresponds to the original data—are referred to as 3D detail level n, and the individual 3D detail levels are generated by reducing the resolution from the original data of the three-dimensional object data, i.e. the 3D detail level n, assignment of the 3D detail level 0 with the lowest resolution to the root node and assignment of the remaining 3D detail levels to a list of 3D detail levels, wherein the 3D detail levels constitute elements that are to be segmented, a) segmentation of the elements that are to be segmented, wherein all of the elements of the respective list having the same segment edges are respectively cut into i approximately equivalent segments and the equivalent segments of the different data levels are respectively compiled into i lists, b) assignment of the i segments of the detail level with the lowest resolution to a respective node, wherein the nodes are each subordinate to a node to which a segment of a detail level with the next lower resolution has been previously assigned and wherein the segments assigned to a node are removed from the respective list, and repetition of steps a) and b) until at least parts of the detail level with the highest resolution have been segmented n times, wherein the segments of the different 3D detail levels contained in the lists constitute the elements that are to be segmented, assignment of level textures to the segments in the different 3D detail levels, which are respectively converted into a resolution that is proportional to the resolution of the respective 3D detail level, wherein in the segmentation, the segment edges of adjacent segments of the 3D detail levels are selected so that they overlap one another and/or are extruded.

2. The method according to claim 1, wherein in the assignment of the level textures, respective texture segments are assigned to the individual segments of the 3D detail levels.

3. The method according to claim 1, wherein the resolution of the level textures of the individual data levels are in approximately the same ratio to one another as the resolutions of the respective 3D detail levels.

4. The method according to claim 1, wherein the three-dimensional object data are embodied of a 3D mesh, which respectively consists of triangular mesh cells.

5. The method according to claim 1, wherein i is a whole number between 2 and 10.

6. The method according to claim 1, wherein in step a) the same number i of segments is respectively produced or the number i of segments to be produced is adapted in such a way that each segment in a detail level requires approximately the same quantity of data to describe the respective segment.

7. The method according to claim 1, wherein individual segments with a high resolution are discarded if their quantity of data for describing the respective segment is below a particular threshold value and the respective segment is a leaf segment.

8. The method according to claim 1, wherein before the generation of multiple levels of the three-dimensional object data, the number n+1 of detail levels at different resolutions is determined by calculating the minimum number n+1 of detail levels in which the quantity of data required to describe the segments with the highest resolution lies below a predetermined threshold value.

9. A method for generating a hierarchical data structure of a three-dimensional object having three-dimensional object data and a texture that is mapped onto the object data, with a predetermined number n+1 detail levels (LOD: levels of detail), wherein the hierarchical data structure is a tree structure with a root node and multiple subordinate nodes, and the hierarchical data structure is embodied with the following steps:

generation of multiple levels of the three-dimensional object data at different resolutions corresponding to the predetermined detail levels, wherein the three-dimensional object data of the detail level with the lowest resolution are referred to as 3D detail level 0 and the three-dimensional object data of the detail level with the highest resolution—which corresponds to the original data—are referred to as 3D detail level n, and the individual 3D detail levels are generated by reducing the resolution from the original data of the three-dimensional object data, i.e. the 3D detail level n, assignment of the 3D detail level 0 with the lowest resolution to the root node and assignment of the remaining 3D detail levels to a list of 3D detail levels, wherein the 3D detail levels constitute elements that are to be segmented, a) segmentation of the elements that are to be segmented, wherein all of the elements of the respective list having the same segment edges are respectively cut into i approximately equivalent segments and the equivalent segments of the different data levels are respectively compiled into i lists, b) assignment of the i segments of the detail level with the lowest resolution to a respective node, wherein the nodes are each subordinate to a node to which a segment of a detail level with the next lower resolution has been previously assigned and wherein the segments assigned to a node are removed from the respective list, and Repetition of steps a) and b) until at least parts of the detail level with the highest resolution have been segmented n times, wherein the segments of the different 3D detail levels contained in the lists constitute the elements that are to be segmented, assignment of level textures to the segments in the different 3D detail levels, which are respectively converted into a resolution that is proportional to the resolution of the respective 3D detail level, wherein before the generation of multiple levels of the three-dimensional object data at different resolutions, independent objects are combined into a three-dimensional object, which is then converted into a hierarchical data structure.

10. A method for generating a hierarchical data structure of a three-dimensional object having three-dimensional object data and a texture that is mapped onto the object data, with a predetermined number n+1 detail levels (LOD: levels of detail), wherein the hierarchical data structure is a tree structure with a root node and multiple subordinate nodes, and the hierarchical data structure is embodied with the following steps:

generation of multiple levels of the three-dimensional object data at different resolutions corresponding to the predetermined detail levels, wherein the three-dimensional object data of the detail level with the lowest resolution are referred to as 3D detail level 0 and the three-dimensional object data of the detail level with the highest resolution—which corresponds to the original data—are referred to as 3D detail level n, and the individual 3D detail levels are generated by reducing the resolution from the original data of the three-dimensional object data, i.e. the 3D detail level n, assignment of the 3D detail level 0 with the lowest resolution to the root node and assignment of the remaining 3D detail levels to a list of 3D detail levels, wherein the 3D detail levels constitute elements that are to be segmented, a) segmentation of the elements that are to be segmented, wherein all of the elements of the respective list having the same segment edges are respectively cut into i approximately equivalent segments and the equivalent segments of the different data levels are respectively compiled into i lists, b) assignment of the i segments of the detail level with the lowest resolution to a respective node, wherein the nodes are each subordinate to a node to which a segment of a detail level with the next lower resolution has been previously assigned and wherein the segments assigned to a node are removed from the respective list, and repetition of steps a) and b) until at least parts of the detail level with the highest resolution have been segmented n times, wherein the segments of the different 3D detail levels contained in the lists constitute the elements that are to be segmented, assignment of level textures to the segments in the different 3D detail levels, which are respectively converted into a resolution that is proportional to the resolution of the respective 3D detail level, wherein before the generation of multiple levels of the three-dimensional object data at different resolutions, the three-dimensional object data are separated from the texture that is mapped onto them.

11. A method for generating a hierarchical data structure of a three-dimensional data structure comprising three-dimensional object data and textures mapped onto them, comprising:

subdividing the hierarchical data structure into multiple detail levels in which the three-dimensional object data are respectively divided into one or more segments and wherein the resolution of the three-dimensional object data and of the corresponding textures of the respective detail level is greater the smaller the segments of the individual data levels are, and in detail levels, which comprise multiple segments, overlapping the segments on one another and/or extruding the segments.

12. The method according to claim 11, wherein the three-dimensional object data have segments with segment edges, wherein the segment edges of a segment of a detail level with a low resolution also exists as a segment edge in all of the detail levels with higher resolutions.

13. The method according to claim 11, from a server or storage medium to an end device on which the three-dimensional hierarchical data structure is displayed by means of a display device, wherein the hierarchical data structure comprises three-dimensional object data and textures mapped onto them and is subdivided into multiple detail levels in which the three-dimensional object data are respectively divided into one or more segments and wherein the resolution of the three-dimensional object data and of the corresponding textures of the respective detail level is greater the smaller the segments of the individual data levels are and in the end device, a point of view, a viewing direction, and a field of view (visual angle; distance) are established, which are to be used for viewing the three-dimensional data structure and which are referred to collectively below as the "virtual camera", wherein a two-dimensional projection of the three-dimensional data structure from the point of view of the virtual camera is displayed on the end device, wherein when a change of an image detail from an actual state to a target state occurs, the detail level of the hierarchical data structure that is suitable for depicting the target state is determined, wherein this determination is independent of the detail level that is used in the actual state, and wherein individual segments of a detail level with a low resolution are substituted by multiple corresponding segments with a higher resolution and vice versa.

14. The method according to claim 13, wherein the determination that is independent of the detail level that is used in the actual state is carried out only if the change of an image detail exceeds a predetermined threshold value and otherwise, when a change from an actual state to a target state occurs, the adjacent segments in the hierarchy of the data structure are loaded.

15. The method according to claim 13, wherein a child bounding volume is used, which is positioned around the active node and if the camera is positioned in the child bounding volume, then the corresponding segments of the child node or nodes are loaded onto the end device and/or a parent bounding volume is used, which is positioned around the active node and if the camera is positioned outside of the parent bounding volume, then the corresponding segment of the parent node is loaded onto the end device, wherein the parent bounding volumes are larger than the respective child bounding volumes.

* * * * *